United States Patent [19]

Fukuda

[11] 4,167,095
[45] Sep. 11, 1979

[54] METHOD OF AND AN APPARATUS FOR CONTROLLING FUEL FLOW IN A ONE SPOOL TYPE GAS TURBINE WITH A HEAT EXCHANGER

[75] Inventor: Daiki Fukuda, Susono, Japan

[73] Assignee: Toyota Jidosha Kogyo Kabushiki Kaisha, Toyota, Japan

[21] Appl. No.: 835,020

[22] Filed: Sep. 20, 1977

[30] Foreign Application Priority Data

May 18, 1977 [JP] Japan .................................. 52/57338

[51] Int. Cl.$^2$ ............................ F02C 7/22; F02C 9/04
[52] U.S. Cl. ................... 60/39.03; 60/39.14 R; 60/39.28 R
[58] Field of Search ................... 60/39.28, 39.14, 39.03

[56] References Cited

U.S. PATENT DOCUMENTS

| | | | |
|---|---|---|---|
| 3,759,037 | 10/1973 | Kiscaden | 60/39.28 T |
| 3,793,826 | 2/1974 | Holleboom et al. | 60/39.14 |
| 3,844,111 | 10/1974 | Fenton | 60/39.14 |
| 3,902,315 | 9/1975 | Martin | 60/39.14 |
| 3,938,320 | 2/1976 | Nelson | 60/39.14 |
| 4,044,554 | 8/1977 | West | 60/39.14 |

Primary Examiner—Robert E. Garrett
Attorney, Agent, or Firm—Stevens, Davis, Miller & Mosher

[57] ABSTRACT

A method of and an apparatus for controlling fuel flow in a one spool type gas turbine with a heat exchanger, particularly applicable during the start-up or acceleration of engine operation. The speed of the gas turbine, temperature at a portion of the gas turbine and compressed air pressure at a portion of the gas turbine are detected as electric signals by sensors. The pressure signal is transmitted to two arithmetic units which perform operations separately to output a starting fuel flow signal $Gf_1$ and an accelerating fuel flow signal $Gf_2$, which signals $Gf_1$ and $Gf_2$ are alternatively selected by a fuel signal change-over device so that when the speed of the gas turbine is at or above a predetermined value, a reference fuel flow signal Gf corresponding to $Gf_1$ is transmitted by the change-over device, and when the speed is below the predetermined value, a reference fuel flow signal Gf corresponding to $Gf_2$ is transmitted by the change-over device. The reference fuel flow signal Gf, after it is compensated by a fuel flow restriction coefficient determined by the temperature signal, is applied to determine fuel flow to the gas turbine by a fuel control actuator. According to this invention, the gas turbine can maintain a fuel flow pattern corresponding to its maximum temperature during the start-up or acceleration of its operation as well as good durability with no particular compensation for changes of atmospheric conditions and gas turbine operation.

10 Claims, 11 Drawing Figures

METHOD OF AND AN APPARATUS FOR CONTROLLING FUEL FLOW IN A ONE SPOOL TYPE GAS TURBINE WITH A HEAT EXCHANGER

BACKGROUND OF THE INVENTION

This invention relates to a method of and an apparatus for controlling fuel flow in a one spool type gas turbine with a heat exchanger, particularly during the start-up or acceleration of its operation.

In a known method of controlling fuel flow for a one spool type gas turbine or engine with a heat exchanger when the rotation of the engine is started or accelerated, a reference fuel flow is determined in proportion to the air pressure at the compressor outlet. According to the method, there is every possibility that the temperature of the engine or the turbine blades may become higher than the tolerable range, when the rotation of the engine is started or accelerated with a large amount of heat energy stored in the heat exchanger. This is caused by the heat energy stored in the heat exchanger which raises the air temperature at the inlet of the combustion chamber of the engine. The amount of the heat energy greatly depends upon the time which has elapsed after the engine is stopped, atmospheric conditions and the like. In such a fuel flow control method, overheating of the engine during its start-up or acceleration is prevented to some extent by selecting a proper one from a plurality of predetermined fuel flow patterns showing the relation between the air pressure at the compressor outlet and the reference fuel flow in respect to the amount of heat energy stored in the heat exchanger. In practice, however, it is difficult to control timing between selection of a proper fuel flow pattern and the time which has elapsed after the engine is stopped, and stepped change of the combustion temperature of the fuel-air mixture increases the complication of the control system.

There has been proposed another fuel flow control method in which the rotational speed (rpm) of the engine is a parameter in place of the air pressure at the compressor outlet. In this system, however, the decrease of engine efficiency caused by a poor compressor performance, the drop of pressure in the heat exchanger or the decrease of air flow due to air leakage cannot be easily compensated, resulting in a bad influence upon combustion of the mixture.

There has been also provided a method in which a fuel flow pattern is selected in such a manner that the maximum fuel flow is determined irrespective of the temperature of the combustion gas at the turbine inlet and when the temperature of the combustion gas becomes such a value as to overheat the engine during its start-up or acceleration, fuel supply is decreased to prevent overheating of the engine. The abrupt decrease of the fuel supply is accompanied with dilution of the fuel-air mixture, which causes incomplete combustion with production of a large amount of hydrocarbons (HC) and carbon monoxide (CO), flame out, engine stopping or the like. The method also causes an abrupt change of temperature which has a bad influence upon durability of the engine.

Thus, the engine operation has been under the influence of the amount of heat energy stored in the heat exchanger when the engine is restarted. This is a definite defect of an automobile engine in which prompt and precise restarting of operation is required.

SUMMARY OF THE INVENTION

An object of this invention is to provide a method of and an apparatus for controlling fuel flow in a one spool type gas turbine with a heat exchanger to maintain the engine temperature at a maximum allowable value, when the rotation of the engine is started or accelerated, regardless of the atmospheric conditions and the amount of heat energy stored in the heat exchanger.

Another object of this invention is to provide a method of and an apparatus for automatically controlling fuel flow, when the rotation of the engine is started or accelerated, in response to the changes of the atmospheric conditions and decrease of the engine efficiency.

A further object of this invention is to provide a method of and an apparatus for controlling fuel flow in which the engine is supplied with a fuel-air mixture having such an air to fuel ratio as to decrease production of pollutants, such as HC and CO, when the rotation of the engine is started or accelerated.

A further object of this invention is to provide such a one spool type gas turbine with a heat exchanger for an automobile as can be readily started or accelerated regardless of the engine temperature which prevails immediately before starting.

DETAILED DESCRIPTION OF THE INVENTION

Figure 1:
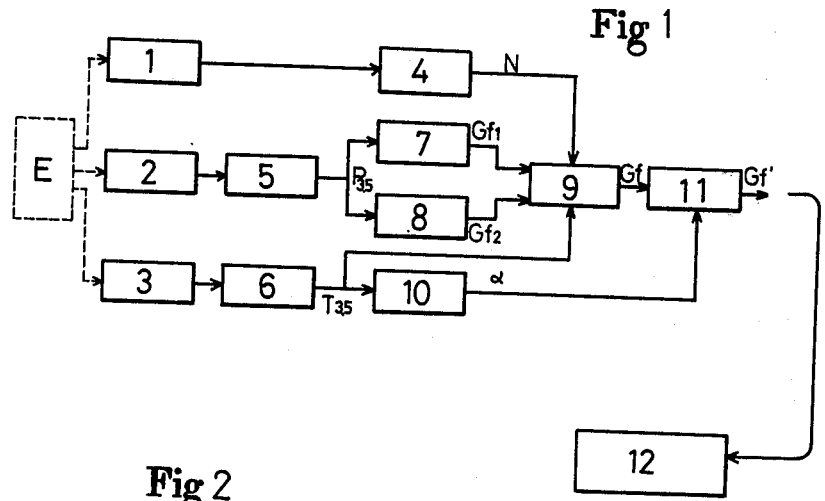
FIG. 1 is a block diagram of an embodiment of this invention.
Figure 2:
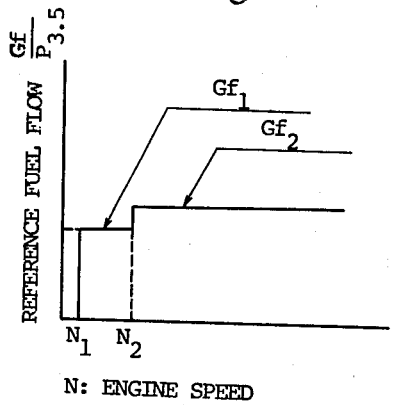
FIG. 2 is a graphic view showing the relationship between the speed N of the engine and the reference fuel flow $Gf/P_{3.5}$.
Figure 7:
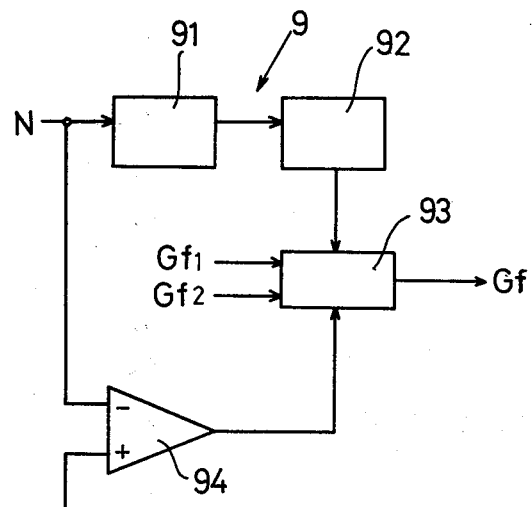
FIG. 7 is a block diagram of the fuel signal change-over device shown in FIG. 1.

In FIG. 1 an engine speed sensor 1 comprising a rotary magnet and an electromagnetic pickup, a heat exchanger outlet pressure sensor 2 comprising a pressure sensitive semiconductor and a heat exchanger outlet temperature sensor 3 comprising a thermocouple and a thermistor are provided for sensing the operational condition of the engine E. A F-V transducer 4 transduces an output frequency of the engine speed sensor 1 into a voltage signal, so that the output of the F-V transducer 4 is a voltage signal proportional to the speed (rpm) of the engine. A signal amplifier 5 amplifies the input signal from the heat exchanger outlet pressure sensor 2 and transmits a pressure output $P_{3.5}$. Another signal amplifier 6 amplifies the input signal from the heat exchanger outlet temperature sensor 3 and transmits a temperature output $T_{3.5}$. The pressure output $P_{3.5}$ is transmitted to arithmetic units 7 and 8, and the arithmetic unit 7 transmits a starting fuel flow signal $Gf_1$ and the arithmetic unit 8 transmits an accelerating fuel flow signal $Gf_2$. The arithmetic units 7 and 8 are Model TA 7504 M units manufactured by Tokyo Shibaura Electric CO., LTD. A fuel signal change-over device 9, which comprises, as shown in FIG. 7, an arithmetic unit 91 (Model TA 7504 M by Tokyo Shibaura Electric CO., LTD), a semiconductor switch 92 (Model TC 4049 P by Tokyo Shibaura Electric CO., LTD.), a semiconductor change-over switch 93 (Model TC 4066 P by Tokyo Shibaura Electric CO., LTD.) and a comparator 94, is provided to alternatively select the signal $Gf_1$ or $Gf_2$ depending upon a parameter of the output N of the F-V transducer 4 and to output a fuel flow reference signal Gf during the start-up or acceleration of the engine. The fuel signal change-over device 9 varies, depending upon a parameter of the output signal $T_{3.5}$ of the signal amplifier 6, the speed $N_1$ at which fuel begins to flow when the engine is started to be actuated by a power source, so that it functions as a choke valve for a reciprocating engine when the engine operation is started. An arithmetic unit 10 generates a fuel flow restriction coefficient α which is a function of $T_{3.5}$. An arithmetic unit 11 receives reference fuel flow signal Gf and fuel flow restriction coefficient α for compensating operation, and outputs an optimum fuel flow signal Gf' during the start-up or acceleration of the engine. The optimum fuel flow signal Gf' is transmitted to an actuator 12 which is provided to control fuel flow to be supplied to the engine. The arithmetic unit 10 is a Model TA 7504 M unit by Tokyo Shibaura Electric CO., LTD., and the arithmetic unit 11 is a Model 8z201(T) unit by AIKOH ELECTRIC CO., Ltd. The actuator 12 is an air flow measuring type electric fuel injection system, which is generally L-Jetronic EFI, to which pulse signals of a predetermined frequency are transmitted.

Figure 6:
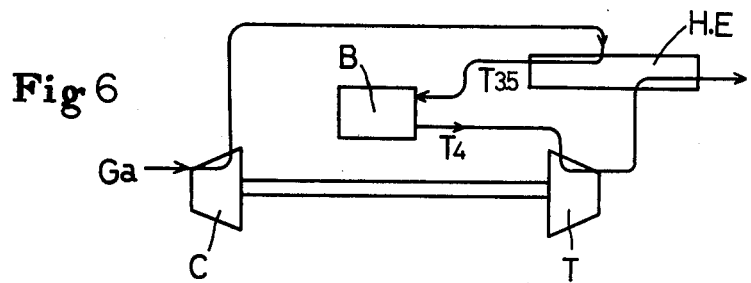
FIG. 6 is a schematic view showing the construction of a one spool type gas turbine with a heat exchanger.

In FIG. 6, the one spool type gas turbine with a heat exchanger comprises a compressor C provided for compressing inhaled air, a heat exchanger HE, a combustor B and a turbine T co-axially connected to the compressor C. The gas temperature $T_4$ at the inlet of the turbine T is an element of the utmost thermal concern. It is desired for durability of the engine to take a step necessary to keep the gas temperature $T_4$ during the start-up or acceleration within a predetermined range. According to the engine characteristics, the gas temperature $T_4$ can be given approximately by adding the air temperature at the heat exchanger outlet and the amount of the temperature rise in the combustor B in the following equation:

$$T_4 = \alpha \cdot Gf/P_{3.5} + T_{3.5}$$

in which $T_{3.5}$: air temperature at the outlet of the heat exchanger HE.

$\alpha \cdot Gf/P_{3.5}$: amount of temperature rise in the combustor B, wherein Gf=fuel flow; $P_{3.5}$=pressure at the outlet of the compressor C; α=fuel flow restriction coefficient.

The amount of the temperature rise in the combustor B can be determined by keeping the air to fuel ratio A/F constant. As the fuel flow Ga is substantially in proportion to the pressure $P_{3.5}$, the fuel flow Ga can be replaced by the pressure $P_{3.5}$. Therefore, the gas temperature $T_4$ can be maintained within a predetermined range by detecting the air pressure $P_{3.5}$ at the outlet of the heat exchanger HE and controlling the fuel flow Gf so that $Gf/P_{3.5}$ becomes constant. The fuel flow Gf in this case is used as a reference fuel flow.

The control system according to the pressure $P_{3.5}$, which can cope with the atmospheric conditions and leakage of the heat exchanger, is advantageously suitable for control in which temperature must be maintained constant.

In the gas turbine with a heat exchanger, control of $Gf/P_{3.5}$ is not sufficient, but the amount of temperature rise in the heat exchanger HE must be taken into consideration, and compensation for it is necessary. As mentioned above, the gas temperature $T_4$ is given in the following equation:

$$T_4 = \alpha \cdot Gf/P_{3.5} + T_{3.5}$$

Then, as the amount of the temperature rise in the combustor B is basically decided by $Gf/P_{3.5}$, the gas temperature $T_4$ can be maintained constant by measuring the heat exchanger outlet temperature $T_{3.5}$. When the utmost value of the gas temperature $T_4$ is X° C., for example 900° C., and the combustion temperature given in the formula $Gf/P_{3.5}$ is set to be X° C. during the start-up or acceleration of the engine, that is $T_4 = Gf/P_{3.5} = X$, the fuel flow restriction coefficient α is given in the following equation:

$$\alpha = -(T_{3.5}/X) + 1$$

Thus, the gas temperature $T_4$ during the start-up or acceleration of the engine can be maintained at X° C. in various conditions of the heat exchanger by controlling reference fuel flow Gf according to α given in correspondence to $T_{3.5}$. In a usual gas turbine, however, when the speed of the engine is low and air flow is relatively small, the air flow is not proportional to the air pressure $P_{3.5}$, but a smaller amount of the air flow is supplied. Therefore, it is preferable to prepare a pattern for reference fuel flow Gf for each of a low speed at which fuel flow is sufficiently high, and select a proper one according to the fuel flow Ga.

In this invention, reference fuel flow Gf and fuel flow restriction coefficient α are controlled in the above-mentioned way.

Figure 3:
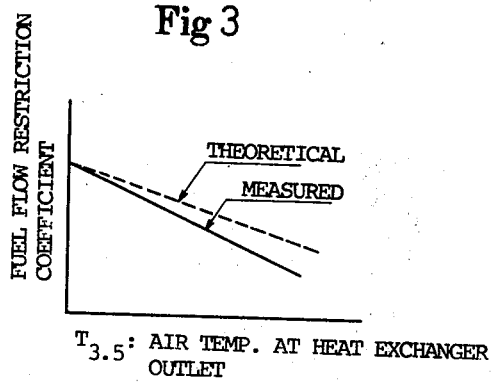
FIG. 3 is a graphic view showing the relationship between the temperature $T_{3.5}$ at the heat exchanger outlet and the fuel flow restriction coefficient $\alpha$.

In operation of a preferred embodiment of this invention shown in FIGS. 1 to 5, the outlet temperature of the heat exchanger sensed by the heat exchanger outlet temperature sensor 3 is transmitted to the signal amplifier 6, which transmits an electric signal $T_{3.5}$ to the arithmetic unit 10. The arithmetic unit 10 then generates a fuel flow restriction coefficient α. Thus, the coefficient α is determined as a function of the electric signal $T_{3.5}$ according to the engine characteristics. In FIG. 3, the abscissa represents an electric signal $T_{3.5}$ which indicates the air temperature at the outlet of the heat exchanger HE, and the ordinate represents the fuel flow restriction coefficient $\alpha$. As shown in FIG. 3, the coefficient $\alpha$ continuously varies in relation to $T_{3.5}$. In order to properly compensate the combustion gas temperature $T_4$ at the turbine inlet in response to the conditions of the heat exchanger by controlling fuel flow or the fuel flow restriction coefficient $\alpha$, it is necessary to perform the compensation according to the effective value shown by a full line in which time lag in the heat exchanger outlet temperature sensor 3 and fuel supply system is taken into consideration, rather than to the value obtained through calculation as shown by a broken line.

The heat exchanger outlet pressure during the start-up or acceleration of the engine is detected by the heat exchanger outlet pressure sensor 2 and transmitted to the signal amplifier 5, which outputs an electric signal $P_{3.5}$. The electric signal $P_{3.5}$ is transmitted to both of the arithmetic units 7 and 8. The arithmetic unit 7 outputs a starting fuel flow signal $Gf_1$ to be applied when the engine is started and the inhaled air flow is small, and the arithmetic unit 8 outputs an accelerating fuel flow signal $Gf_2$ to be applied when the engine operation is accelerated and the inhaled air flow is large. As shown in FIG. 7, the change-over device 9 comprises an arithmetic unit 91 which receives the signal N from the F-V transducer 4 and compares it with the predetermined value $N_2$ (FIG. 2) to control the semiconductor switch 92. The semiconductor switch 92 transmits, according to the result of comparison by the arithmetic unit 91, a command signal to the semiconductor change-over switch 93, so that when the speed of the engine is below $N_2$ the signal $Gf_1$ is passed, and when the speed of the engine is greater than $N_2$ the signal $Gf_2$ is passed. Thus, the change-over device 9 alternatively selects the starting fuel flow signal $Gf_1$ and the accelerating fuel flow signal $Gf_2$ in accordance with the speed of the engine, and outputs a reference fuel flow signal Gf. The output signal $T_{3.5}$ of the signal amplifier 6 is transmitted to the comparator 94 of the change-over device 9. When the signal N from the F-V transducer 4 is smaller than a value $N_1$ determined by the signal $T_{3.5}$ (FIG. 2: $N_1 < < N_2$), the comparator 94 transmits a cut-off signal to the semiconductor change-over switch 93 so that it is completely cut off to stop outputting of the signal Gf. Then, $N_1$ represents the speed of the engine at which fuel begins to flow when the engine is started. As $N_1$ is determined in correspondence to the heat exchanger outlet temperature signal $T_{3.5}$, the change-over device 9 functions as a choke valve during the start-up of the engine so as to increase the starting efficiency of the engine. In order to control the speed $N_1$ according to the engine characteristics, the signal $T_{3.5}$ may be transmitted to the comparator 94 through a proper arithmetic unit.

The reference fuel flow signal Gf is compensated in the arithmetic unit 11 in response to the output signal $\alpha$ of the arithmetic unit 10, and the arithmetic unit 11 transmits an optimum fuel flow signal Gf' to the fuel control actuator 12.

The speed of the engine at which switching between the starting fuel flow signal $Gf_1$ and the accelerating fuel flow signal $Gf_2$ is carried out is predetermined according to the engine characteristics. The starting fuel flow signal $Gf_1$ is applied when the speed of the engine is low and the amount of air flow is small, while the accelerating fuel flow signal $Gf_2$ is applied when the speed of the engine is high and the amount of air flow is large. Though the $Gf/P_{3.5}$ pattern shown in FIG. 2 has only two steps, $Gf/P_{3.5}$ may be functionally corresponding to the engine characteristics, which, however, causes complication of the control system.

Figure 4:
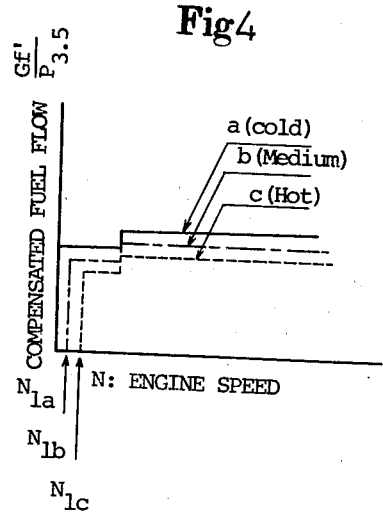
FIG. 4 is a graphic view showing the relationship between the speed N of the engine and compensated fuel flow $Gf'/P_{3.5}$ when the engine temperature is low (a), middle (b) or high (c).
Figure 5:
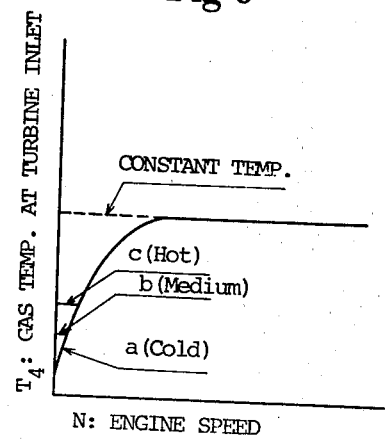
FIG. 5 is a graphic view showing the relationship between the speed N of the engine and the combustion gas temperature $T_4$ at the gas turbine inlet when the engine temperature before starting is low (a), middle (b) or high (c).

In FIG. 4, compensated fuel flow becomes smaller as the engine temperature before starting becomes higher and, therefore, the fuel flow restriction coefficient $\alpha$ becomes smaller. The speed of the engine at which fuel begins to flow when the engine operation is started, which functions as a choke valve, increases as the engine temperature before starting becomes high, within the range from $N_{1a}$ to $N_{1c}$. In FIG. 5 which shows the characteristics of the turbine inlet combustion gas temperature $T_4$, the gas temperature $T_4$ settles at a maximum temperature as the speed N of the engine increases, without regard to the engine temperature before starting. The turbine inlet combustion gas temperature $T_4$ may be practically measured to control Gf by feedback so that the gas temperature $T_4$ settles at a constant value, but, the gas temperature $T_4$ is so high that it is rather difficult to provide a sensor for $T_4$ having enough heat resistance against such a high temperature. Then, the calculated temperature given in the equation $T_4h = T_6 + (T_3 - T_0)$ can be used in place of the practical gas temperature $T_4$: wherein $T_0$: temperature at the compressor inlet
$T_3$: temperature at the compressor outlet
$T_6$: temperature at the turbine outlet.

Figure 8:
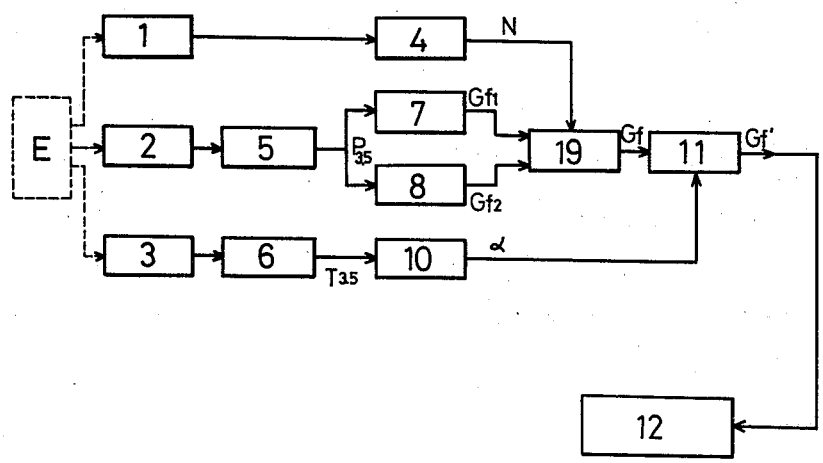
FIG. 8 is a block diagram of another embodiment of this invention.
Figure 9:
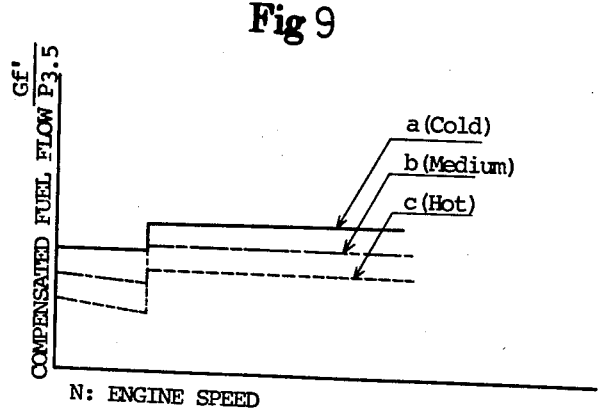
FIG. 9 is a graphic view showing the relationship between the speed N of the engine and compensated fuel flow $Gf'/P_{3.5}$ in the second embodiment.
Figure 10:
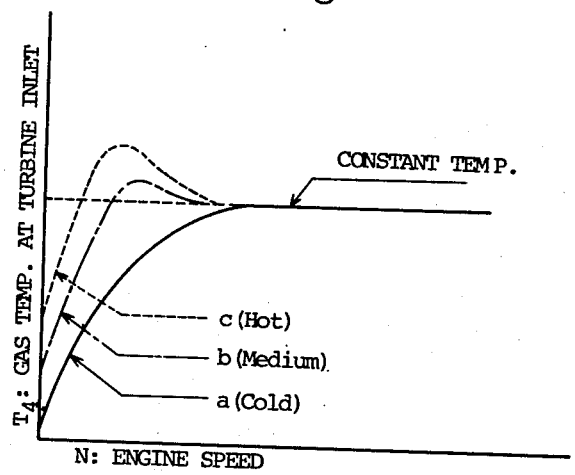
FIG. 10 is a graphic view showing the relationship between the speed N of the engine and combustion gas temperature $T_4$ at the gas turbine inlet in the second embodiment.
Figure 11:
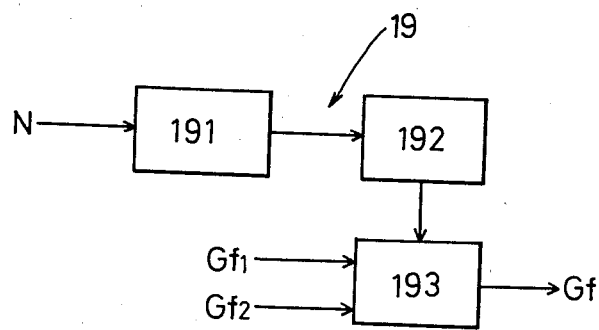
FIG. 11 is a block diagram of the fuel signal change-over device 19 shown in FIG. 8.

FIG. 8 shows another embodiment of this invention which is similar to the one shown in FIG. 1 but in which the temperature signal $T_{3.5}$ is not transmitted to the change-over device 19. The signal N from the F-V transducer 4 is transmitted to an arithmetic unit 191 (FIG. 11) in the change-over device 19, and the arithmetic unit 191 compares the signal N with the predetermined value $N_2$ to control a semi-conductor switch 192. The semi-conductor switch 192 outputs a command signal to a semiconductor change-over switch 193 according to the result of a comparison by the arithmetic unit 191, so that the semiconductor change-over switch 192 permits passing of $Gf_1$ when N is smaller than $N_2$, while it permits passing of $Gf_2$ when N is larger than $N_2$. It will be noted that outputting of Gf will not be suspended even when N is smaller than $N_1$. FIG. 9 shows the relationship between the engine speed N and the compensated fuel flow $Gf'/P_{3.5}$ in the second embodiment shown in FIG. 8 when the engine temperature during start-up is low, medium or high, which is similar to FIG. 4. FIG. 10 shows the relationship between the engine speed N and the turbine inlet combustion gas temperature $T_4$ in the second embodiment shown in FIG. 8 when the engine temperature at starting is low, middle or high, which is similar to FIG. 5. As shown in FIG. 10, when the turbine inlet combustion gas temperature $T_4$ is so set that it will settle at an optimum temperature as the speed of the engine is increased, the gas temperature $T_4$ exceeds the optimum value during the start-up of the engine; while when the gas temperature $T_4$ during the start-up of the engine is to be held below the optimum temperature, the gas temperature $T_4$ does not reach the optimum value as the engine speed is increased. Then, a complicated control system is required to keep the gas temperature $T_4$ at any time within a satisfactory range.

What is claimed is:

1. A method of controlling fuel flow in a one spool type gas turbine with a heat exchanger, particularly applicable during the start-up or acceleration of turbine operation, said method comprising the steps of detecting as electric signals the speed of rotation of the gas turbine, temperature at a portion of the gas turbine and compressed air pressure at a portion of the gas turbine; obtaining a starting fuel flow signal $Gf_1$ and an accelerating fuel flow signal $Gf_2$ by performing separate operations of the pressure signal; alternatively selecting the fuel flow signal $Gf_1$ or $Gf_2$ in response to the turbine speed signal to obtain a reference fuel flow signal $Gf$ corresponding to the selected fuel signal; and transmitting to the gas turbine the reference fuel flow signal $Gf$ after it is compensated by a fuel flow restriction coefficient determined by the temperature signal.

2. The method as defined in claim 1, wherein said compressed air pressure is detected at the outlet of the heat exchanger.

3. The method as defined in claim 1, wherein said temperature is detected at the outlet of the heat exchanger.

4. The method as defined in claim 1, wherein said compressed air pressure and said temperature are both detected at the outlet of the heat exchanger.

5. The method as defined in claim 1, wherein the speed of rotation of the gas turbine at which fuel begins to flow during the start-up of the gas turbine is determined by said temperature signal.

6. The method as defined in claim 5, wherein said compressed air pressure is detected at the outlet of the heat exchanger.

7. The method as defined in claim 5, wherein said temperature is detected at the outlet of the heat exchanger.

8. The method as defined in claim 5, wherein said compressed air pressure and said temperature are both detected at the outlet of the heat exchanger.

9. A fuel flow control apparatus for a one spool type gas turbine with a heat exchanger, particularly applicable during the start-up or acceleration of turbine operation, which comprises:
   a F-V transducer which transduces the speed of rotation of the gas turbine into an electric signal N;
   arithmetic units which input an electric signal P corresponding to compressed air pressure at a portion of the gas turbine and perform separate operations to output a starting fuel flow signal $Gf_1$ and an acceleting fuel flow signal $Gf_2$;
   an arithmetic unit which inputs an electric signal T corresponding to temperature at a portion of the gas turbine and outputs a fuel flow restriction coefficient $\alpha$;
   a fuel signal change-over device which alternatively selects $Gf_1$ or $Gf_2$ in response to the electric signal N to output a reference fuel flow signal $Gf$;
   an arithmetic unit which inputs the reference fuel flow signal $Gf$ and the fuel flow restriction coefficient $\alpha$ to output a compensated fuel flow signal $Gf'$; and
   an actuator which inputs the compensated fuel flow signal $Gf'$ to control fuel flow according thereto during the start-up or acceleration of the gas turbine operation.

10. The apparatus as defined in claim 9, wherein the fuel signal change-over device stops to output said fuel flow signal $Gf_1$ when the signal N from said F-V transducer is smaller than a value $N_1$ determined by said electric signal T.

* * * * *